Inventors:
JAMES COLQUHOUN MACFARLANE
WILLIAM IAN MACFARLANE
By
Richardson, David and Nordon
Attorneys Patented Aug. 24, 1954

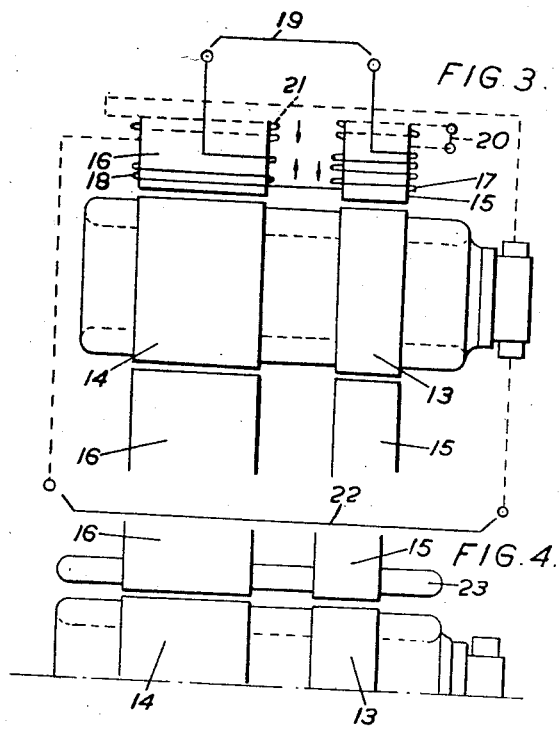
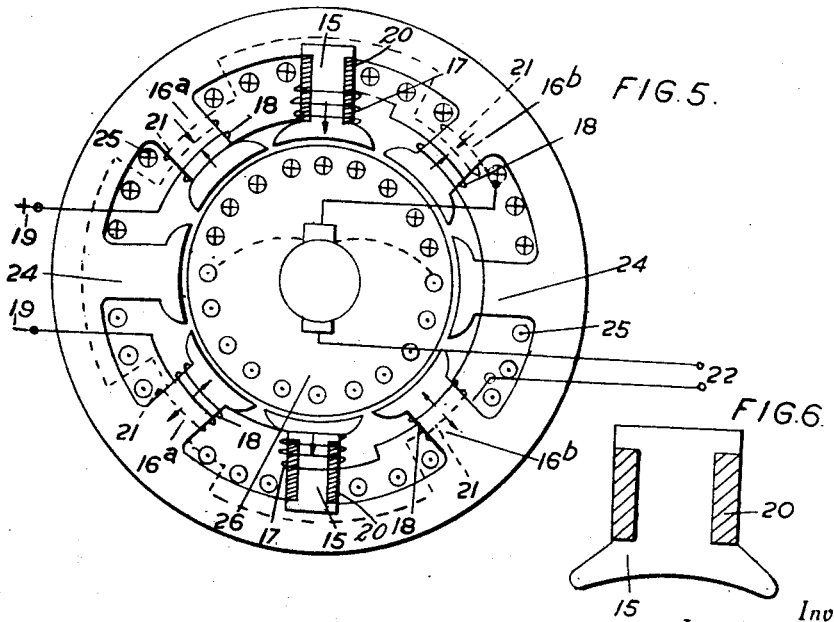

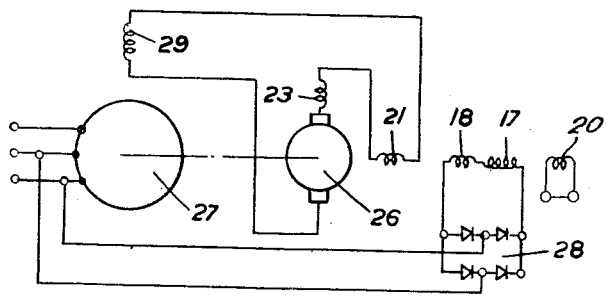
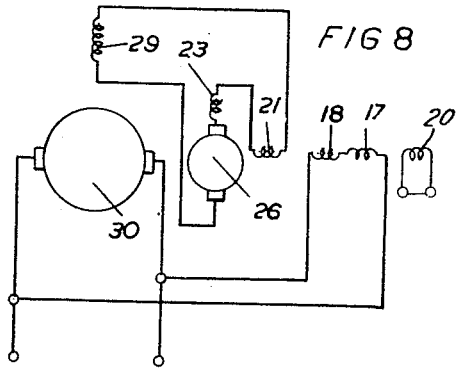
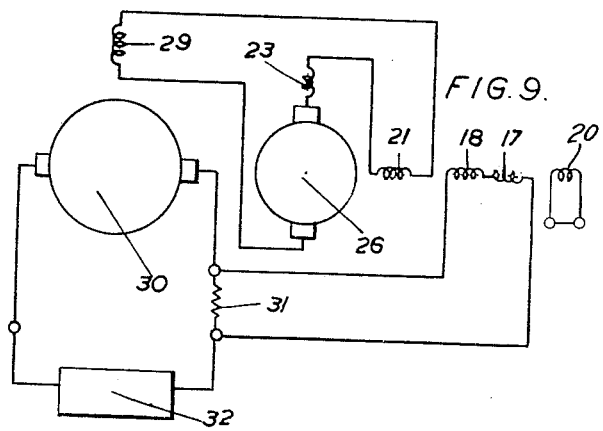

2,687,506

UNITED STATES PATENT OFFICE 2,687,506

ELECTRIC GENERATOR

James C. Macfarlane, Braehead, Cathcart, Glasgow, and William I. Macfarlane, Alderwood, Cathcart, Glasgow, Scotland Application March 4, 1952, Serial No. 274,687

7 Claims. (Cl. 322—65)

This invention relates to dynamo electric generators for purposes where it is desired to control quantities which can be expressed as representative electric currents, and where it is usually but not necessarily desired to hold such quantities substantially constant by balancing the effects of such representative currents in the generator against fixed or predictable reference quantities. Such a generator may be used as a rapidly acting exciter for a main A. C. or D. C. generator or motor so as to control a characteristic of the main machine rigidly; constant; as a constant current, variable voltage generator; or as a generator with variable drooping characteristic; an example being a generator for arc welding. These, and similar uses may be obtained from an electric generator of the aforesaid type by variation in the types of field windings employed (shunt, series, separate and combinations of these); by variation in the length and shape of the airgaps under the field poles; or by variations in the degree of magnetic saturation in the various magnetic circuits employed.

In accordance with the present invention, we provide means for controlling a quantity which can be represented by an electrical current (hereinafter called the "controlled current"), comprising a generator including an armature system, and a field system comprising main excitation windings self-excited by a function of the generator output, and supplementary excitation means comprising a relatively saturated field part and a relatively unsaturated field part, windings on these field parts acting in opposition with reference to said armature system and so that their resultant excitation is self-neutralising at a predetermined input thereto, a control circuit adapted to carry said controlled current, means for supplying the input to the windings of said field parts with the current in said control circuit or a function thereof and means for varying the energisation of the control circuit from the output at the terminals of the generator, whereby with variation in said controlled current, the excitation effect on the armature system varies and thus brings into being a generated resultant current at the generator output terminals which tends to correct said variation.

Said armature system may comprise two armatures connected in series, which may be independent units, but are preferably formed either as separate cores with a common winding and mounted on a common axis; or are replaced by a single armature core and windings.

Preferably the relatively saturated field part is completely saturated so as to provide a non-varying reference value.

Thus let it be assumed that the quantity to be controlled can be represented by an electric current (the controlled current) and that the output of the generator, if properly controlled, can correct for variation in the quantity to be controlled. Further, let it be assumed that the controlled current excites the field poles of a magnetically unsaturated generator so that an E. M. F. is produced at the brushes proportional to the control current, and that this generator is connected in series with a source of constant E. M. F., for example, a battery or second generator, the connection being such that the E. M. F.'s produced are in opposition to one another, and are self-neutralising at a predetermined value of the controlled quantity. The resultant voltage obtained from the two E. M. F. sources combined will then be a measure of the difference of the quantity to be controlled from the standard as represented by the constant E. M. F. source, and may be used to correct for the deviation of the controlled quantity from a standard set value. Interpoles may of course be provided.

Various embodiments and applications of generators according to our invention will now be described, by way of example, with reference to the accompanying diagrammatic drawings in which:

Fig. 3 is a view of a generator according to Fig. 1.

Figure 1:
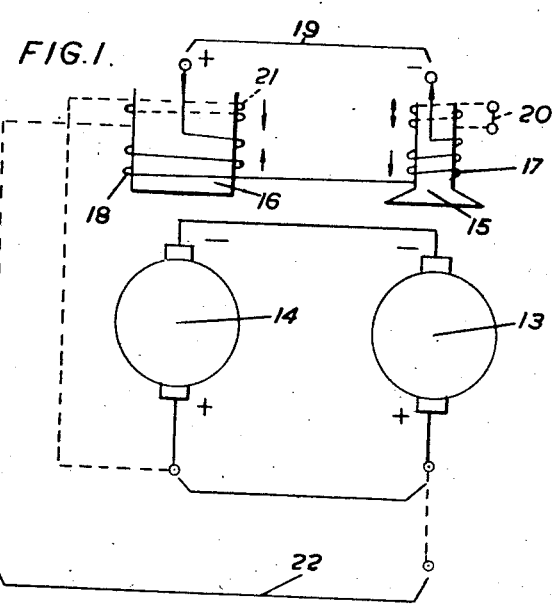
Figs. 1 and 2 are circuit diagrams of electric generators having windings according to the present invention, additional windings being shown chain-dotted.

Fig. 4 is a view of the generator according to Fig. 3, and showing the disposition of the compensating winding if the field construction is of the non-salient pole type, Fig. 5 is an armature and field diagram of an electric generator having windings according to a preferred embodiment of the present invention, Fig. 6 shows a section through a retentive pole-piece bound by an amortisseur coil, and Figs. 7 to 12, inclusive, illustrate different uses to which the generator according to any of Figs. 1, 2, 3, 4, or 5 can be put.

Throughout the drawings, similar parts are denoted by the same reference characters.

In the invention the source of constant E. M. F. is a generator in which parts of the magnetic circuit (normally the field pole bodies) are magnetically saturated and the field coils are coupled in series with the field coils of the "opposition" generator, the turns on the constant E. M. F. generator field being such as to saturate part of the magnetic path when the two E. M. F.'s are in balance. By this means only a single circuit control system is necessary and failure of the control system removes the excitation from both generators together, so that the dangerous conditions which would exist, if one lost excitation while the other generated high positive or negative voltage, is obviated. In addition with this method of excitation if a voltage is being controlled and a short circuit occurs or a current is being controlled and an open circuit occurs, the loss of excitation of both controlling generators prevents the production of dangerous short circuit currents or open circuit voltages under the respective conditions.

With the system as outlined above the control circuit has to supply the full excitation for both machines and as a difference of E. M. F. is always required to produce a controlling effect, exactly constant control cannot be achieved. These difficulties can be overcome either by compounding the unsaturated generator by means of field coils wound on the unsaturated part of the field system and connected in series with the combination of the two generator armatures or by means of main field coils wound on the unsaturated part of the fields system and connected across the output terminals of said combination of the two generator armatures; the particular method employed depending on the application. The amount of compounding can be varied to give a level, drooping, or rising characteristic as the controlled quantity varies in any desired manner.

Figure 2:
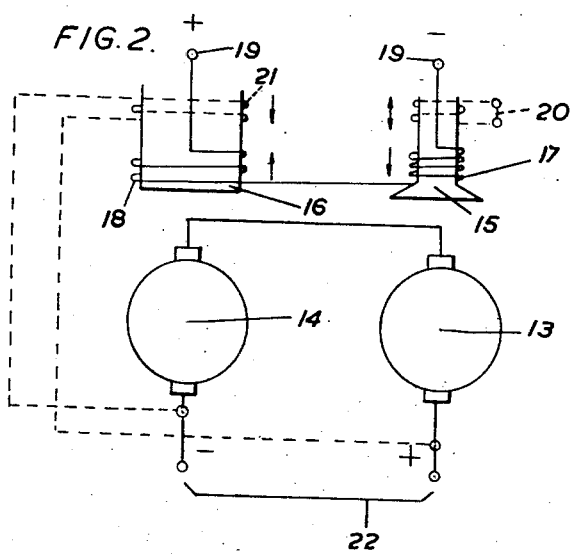

Referring to Figs. 1 and 2, a first embodiment of the generator comprises two D. C. armature commutator assemblies 13, 14 co-acting with a main excitation and a supplementary excitation provided by a field system comprising two axially-disposed magnetic field parts, of which cores 15 are magnetically saturated and may be of a slightly retentive nature, and cores 16 are unsaturated, when both carry the same flux. The field windings 17 on cores 15, and field windings 18 on cores 16, are connected in series to act in opposition to each other and are supplied by a control circuit 19, the current in which is a function of an electric quantity to be controlled, such that the resultant excitation is self-neutralising at a predetermined input thereto. Here the E. M. F. produced by the armature 13 is opposed by that produced by the armature 14. The saturated pole-cores 15 may be further protected by amortisseur coils 20.

Main field self-excited coils 21 are wound on the unsaturated pole-cores 16, normally of the same polarity as the saturated pole-core 15, and may be either connected in series with the armature assemblies 13, 14 (Fig. 1) or in shunt across them (Fig. 2). These coils may further be designed to give the desired generator output characteristic. Hence the output in the controlled circuit 22 alters in accordance with any variation of the controlled quantity from that desired, and is used to correct said variation in the quantity to be controlled.

Since the two generators are coupled in series to give the resultant control, they may be replaced by a field system comprising two field parts acting on the one armature, in opposition, to produce the resultant differential series effects within each pole pitch so that the voltage appearing at the brushes is in effect the resultant.

Referring to Figs. 3 and 4, the two armature cores 13 and 14 are mounted on a common shaft, the armature winding embraces both of said cores, and the field parts are mounted on a common frame. The lengths of the abutment of saturated field core 15 and of the unsaturated field core 16 are arranged to give a suitable degree of saturation in the abutment magnetic circuit when the field coils carry normal currents. A typical relationship between the core lengths is about 2:1, the unsaturated field system having the longer length.

The armature winding of this arrangement is of the conventional drum type and the coils thereof are housed in slots in both cores 13 and 14. The field system is wound with both field windings in series and supplied from the control circuit 19, the winding 17 on the abutment of saturated poles 15 having a large number of turns, while the winding on the unsaturated poles 16 has a relatively few number of turns. The winding 18 is arranged to give to said unsaturated field core 16 a polarity of opposite sign to that of the axially disposed abutment pole-core 15. Amortisseur or damping windings 20, short circuited on themselves, may be wound round the saturated poles 15 so as further to damp any tendency for the "constant field" to vary due to transient changes in the field or armature circuits. The main-self-excited coils 21 are coupled either in series with the armature combination as shown or may be in shunt across the armature brushes. Said coils 21 are wound on the unsaturated pole-pieces 16; they will normally induce the same polarity as the axially disposed abutment poles 15. The field construction may be either salient pole or non-salient pole with compensating windings housed in slots therein. If the latter construction is used (Fig. 4) the compensating winding 23 is carried through slots in both cores. Interpoles may be fitted as required.

In a second embodiment of our invention the saturated and unsaturated pole pieces are circumferentially disposed in each pole pitch, the windings being disposed on the saturated and unsaturated pole-pieces as in the axially disposed machine, but in this case the relative polarities will be within the same pole pitch. As before the field may be of the salient pole or non-salient polar construction and interpoles and compensating windings may be fitted as required.

Fig. 5 shows a preferred construction of this second embodiment wherein the field structure consists of four equal sections per pole pitch, each section containing an equal number of teeth (at the simplest one tooth per section). Three sections 16a, 15 and 16b form the body of the main pole and the fourth 24 forms the body of the interpole. Armature reaction is fully compensated by coils 25 disposed in the slots of the field structure, and spanning across the interpolar axis. Of the three sections which form the main polar body the center section 15 forms the main polar body the saturated "constant E. M. F." field and is wound with a relatively large number of turns 17 so as magnetically to saturate the bodies of the polar teeth. As in the axially disposed machine the saturated pole 15 may be wound with amortisseur coils so as to damp any tendency for the "constant" flux to vary transiently. The two outer sections 16a and 16b together comprise the unsaturated field and are wound with relatively few turns 18, in the control circuit 19, so as to give a polarity opposite to that of the center section 15. Also disposed on the outer section are main self-excited coils 21 wound normally to have the same polarity as the center section 15.

In cases where the generator according to our invention is required to self-excite, the initial excitation is caused by the difference of the residual of the saturated and unsaturated pole-pieces, and under some conditions this may not be sufficient. This difficulty is overcome by making the saturated portion of the magnetic circuit of a slightly more retentive nature than the normal iron. In the first embodiment the whole field stamping or pole may be made in this way. In the second embodiment the center section of the pole may be replaced by a small inserted tooth or pole of a retentive nature, and in a preferred construction, shown in Fig. 6, this small inserted pole 15 is made by building retentive pole stampings into a heavy copper amortisseur coil 20 so that the coil acts as a clamp to hold the pole together. The coil 20 normally consists of a single loop of heavy strap copper.

In the second embodiment only one armature core 26 is required as there is only one field system and the field parts thereof have axes acting in the same plane.

The generators hereinbefore described with reference to Figs. 1 to 6 are each adapted for various uses, and example of such uses are illustrated by Figs. 7 to 12.

In each of Figs 7 to 12, a generator is shown having an armature 26, a magnetically saturated field part 17, a magnetically unsaturated field part 18, a self-excited main field part 21, and a compensating field part 23. In each instance the amortisseur winding will in practice be provided. The generator shown in each of Figs. 7 to 12 is intended to represent, in a conventional manner, any of the constructions described with reference to Figs. 1 to 6.

As an example of the use of generator as an exciter, it can be used to maintain constant voltage of an alternator under varying load conditions. In this case (Fig. 7) the control circuit 17, 18 of the generator is connected across two of the output terminals of the alternator 27, the controlled current being rectified by a small metal rectifier 28, while the output of the generator 26 supplies the alternator field 29. The direct current in the control circuit 17, 18 is proportional to the output voltage of the alternator 27. The self-excited coils 21 are designed to produce a sufficiently strong magneto-motive-force to cause the generator to supply the necessary current to the alternator field 29, to give the full alternator output voltage. Then, if due to load changes or the like, the alternator voltage tends to change, the balance of the E. M. F.'s is altered so as to restore the original alternator voltage.

Although in this embodiment the self-excited coils 21 are shown connected in series with the output of the generator 26, it is obvious that a similar result may be obtained by having the self-excited coils 21 coupled in shunt across the output terminals of the generator 26.

It will be obvious that a D. C. generator 30, Fig. 8, can be controlled in a similar way, no rectifier being required in the control circuit 17, 18. With correctly designed self-excited coils 21, the main generator 30 will give a constant output voltage over a wide range of speed.

Fig. 9 shows an embodiment in which the control circuit 17, 18 is shunted across a resistance 31 in the output circuit of a D. C. main generator 30. In this case the controlled current will be proportional to the current in the load 32 of the main generator 30, and the exciter 26 then controls the field 29 of the main generator 30 to give a constant current output.

By shunting the control circuit across a resistance in the generator output circuit, said generator will maintain its own output current constant and thus acts as a constant-current system.

Figure 10:
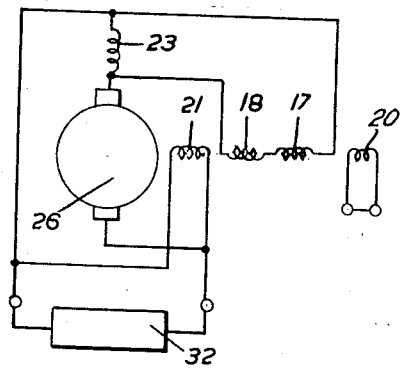
Figure 11:
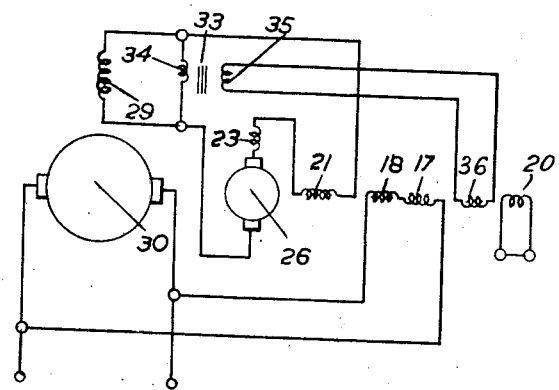

Fig. 10 shows one embodiment of this construction, in which the control circuit 17, 18 is shunted across the compensating winding 23 for this purpose. Then if due to load charges or the like, the current in the load 32 and hence in the compensating winding 23 changes, the voltage drop across said winding 23 will change. The voltage across the control circuit 17, 18 will then change, correspondingly, such that the current in the load 32 is restored to its original value.

A drooping characteristic machine suitable for welding and similar applications can be made by arranging that the generator holds its current constant until magnetic saturation of the relatively unsaturated field part makes the generator output characteristic tilt over; the light load voltage being obtained by use of retentive material in the saturated magnetic circuit as previously described. The "constant current" part of the characteristic may be modified to increase or decrease current with increasing voltage by alteration of the self-excited main coils.

Figure 12:
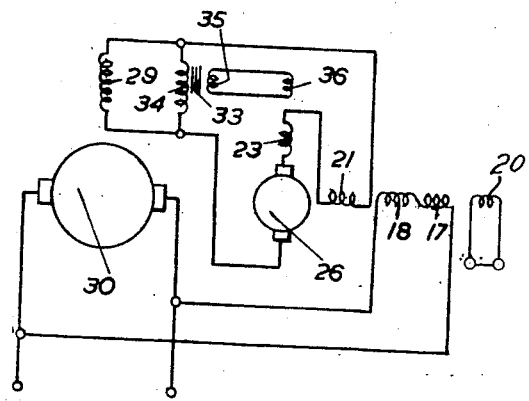

While the response of the generator 26 as specified will be fast enough for most applications, it may be necessary under very fast transient changes to improve the speed of response. This may be done transiently (Figs. 11 and 12) by means of an injector transformer 33, whereof the primary 34 is coupled into or across a circuit with the desired transient characteristic, while the secondary 35 supplies a transient control circuit 36 which may be wound either on the non-saturated pole pieces (Fig. 11) or to span the interpolar axis (Fig. 12). In the former case a transient M. M. F. is created in the main pole under the sudden change in the transformer primary circuit 29, 34, and in the latter case the M. M. F. created on the interpolar axis causes the coils undergoing commutation under the brushes to carry circulating currents which, in turn, inject an amplified transient M. M. F. into the main polar axis. Such an injector transformer circuit is described in U. S. Specification No. 2,562,052.

As an example of the use of such an injector transformer, let it be assumed that the exciter has very quickly to increase the current through the field 29 of the main generator 30, the field 29 having a considerable time constant. Owing to the time constant of the field, the build up of the current in the field coils 29 will lag considerably behind the rise of voltage from the exciter 26. If, however, the injector transformer 33 is coupled across the output of the exciter 26, the sudden rise of voltage across the primary 34 will cause the secondary 35 suddenly to increase the M. M. F. on the main pole as indicated above. Thus the voltage impressed across the field coils 29 of the main generator 30 will be suddenly and transiently increased and the current in said coils 29 will rise at a much faster rate than would occur if the injector circuit were not fitted.

We claim:

1. A generator whereof the output is adapted to effect generation of and to maintain at a preselected set value a quantity which can be represented by an electrical current (hereinafter called the "controlled current"), comprising an armature; a pair of output brushes therefor; a field system comprising a relatively saturated field part, and a relatively unsaturated field part; main excitation windings on the latter field part self-excited from a function of the generator output at said brushes; a control circuit adapted to carry a current which is a function of the controlled current; and control windings on each field part connected to said control circuit, the ampere turns of the control windings being designed to act mutually in opposition with reference to said armature system and so that their resultant excitation is self-neutralising only when said controlled current is at the set value, whereby any variation in the controlled current from the set value varies the generated resultant current at the output brushes to correct said variation.

2. The combination with a main generator having a main field winding of an exciting generator comprising an armature; a pair of output brushes therefor; a field system comprising a relatively saturated field part, and a relatively unsaturated field part; main excitation windings on the latter field part self-excited from a function of the exciting generator output at said brushes; a control circuit adapted to carry a current which is a function of the output current of the main generator; and control windings on each field part connected to said control circuit, the ampere turns of the control windings being designed to act mutually in opposition with reference to said armature system and so that their resultant excitation is self-neutralising only when said output current of the main generator is at a preselected set value, whereby any variation in this current from the set value varies the generated resultant current at the output brushes and hence the excitation of said main field winding to correct said variation.

3. The combination claimed in claim 2, in which said field system comprises three circumferentially spaced part-poles per pole pitch, the center part-pole forming the relatively saturated field part and the two outer part-poles together forming the relatively unsaturated field part.

4. The combination claimed in claim 3 comprising an interpole between each adjacent set of part-poles, a compensating field coil embracing each inter-pole and wound from each center part-pole to the adjacent center part-pole so as to embrace also the intermediate outer part-poles, and means connecting the compensating field coils in series with the armature brushes to balance out substantially the M. M. F. due to armature reaction.

5. A generator whereof the output is adapted to effect generation of and to maintain at a preselected set value a quantity which can be represented by an electrical current (hereinafter called the "controlled current"), comprising an armature; a pair of output brushes therefor; a field system comprising a completely saturated field part, a relatively unsaturated field part and a field part forming an interpole; main excitation windings on the relatively unsaturated field part self-excited from a function of the generator output at said brushes; compensating windings wound on the interpole field part and connected in series with the armature; a control circuit adapted to carry a current which is a function of the controlled current; and control windings on each field part connected to said control circuit, the ampere turns of the control windings being designed to act mutually in opposition with reference to said armature system and so that their resultant excitation is self-neutralising only when said controlled current is at the set value, whereby any variation in the controlled current from the set value varies the generated resultant current at the output brushes to correct said variation.

6. A generator whereof the output is adapted to effect generation of and to maintain at a preselected set value a quantity which can be represented by an electrical current (hereinafter called the "controlled current"), comprising an armature including two independent cores mounted on a common axis, and a common armature winding thereon; a pair of output brushes therefor; a field system comprising a relatively saturated field part co-acting with one of the cores, and a relatively unsaturated field part co-acting with the other of the cores; main excitation windings on the latter field part self-excited from a function of the generator output at said brushes; a control circuit adapted to carry a current which is a function of the controlled current; and control windings on each field part connected to said control circuit, the ampere turns of the control windings being designed to act mutually in opposition with reference to said armature system and so that their resultant excitation is self-neutralising only when said controlled current is at the set value, whereby any variation in the controlled current from the set value varies the generated resultant current at the output brushes to correct said variation.

7. A generator whereof the output is adapted to effect generation of and to maintain at a preselected set value a quantity which can be represented by an electrical current (hereinafter called the "controlled current"), comprising an armature; a pair of output brushes therefor; a field system comprising a relatively saturated field part, and a relatively unsaturated field part; main excitation windings on the latter field part self-excited from a function of the generator output at said brushes; amortisseur windings, short circuited on themselves, and embracing the relatively saturated field part to dampen any tendency of the saturated field thereof to vary; a control circuit adapted to carry a current which is a function of the controlled current; and control windings on each field part connected to said control circuit, the ampere turns of the control windings being designed to act mutually in opposition with reference to said armature system and so that their resultant excitation is self-neutralising only when said controlled current is at the set value, whereby any variation in the controlled current from the set value varies the generated resultant current at the output brushes to correct said variation.

References Cited in the file of this patent

UNITED STATES PATENTS

| Number | Name | Date |
| --- | --- | --- |
| 1,220,370 | Spencer | Mar. 27, 1917 |
| 1,389,051 | Kesslering | Aug. 30, 1921 |
| 2,483,146 | Merrill | Sept. 27, 1949 |
| 2,562,052 | Macfarlane et al. | July 24, 1951 |